J. ARNER.
TRANSMISSION MECHANISM.
APPLICATION FILED MAR. 14, 1914.

1,226,048.

Patented May 15, 1917.
2 SHEETS—SHEET 1.

Joseph Arner
Inventor, by C. A. Snow & Co.
Attorneys.

Witnesses

J. ARNER.
TRANSMISSION MECHANISM.
APPLICATION FILED MAR. 14, 1914.
1,226,048.
Patented May 15, 1917.
2 SHEETS—SHEET 2.
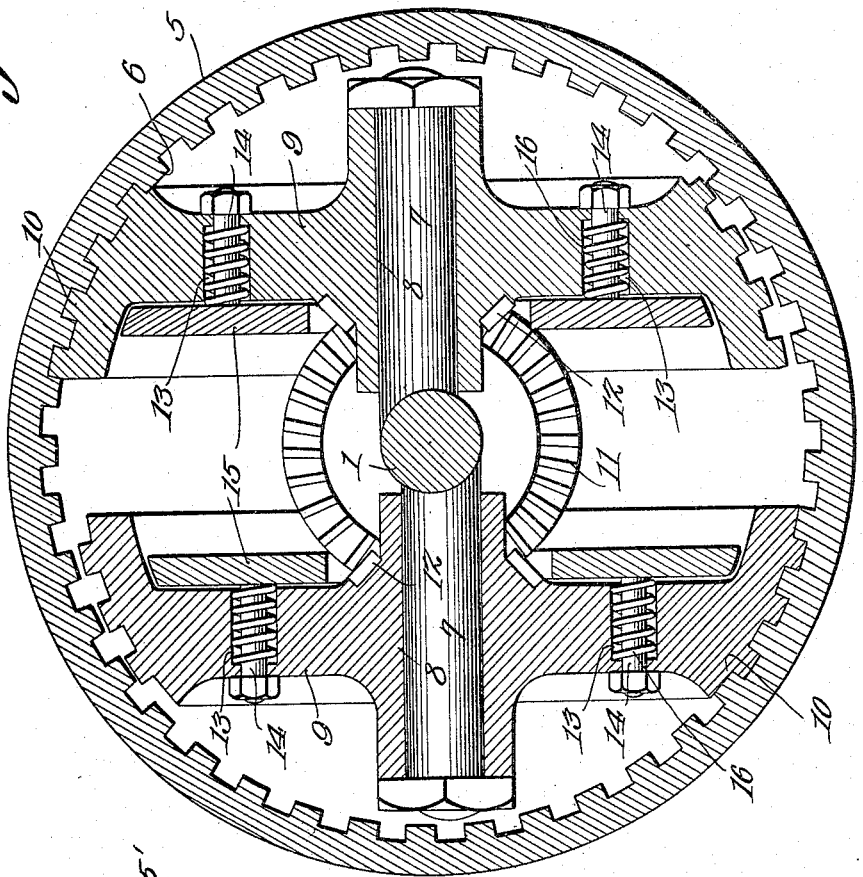
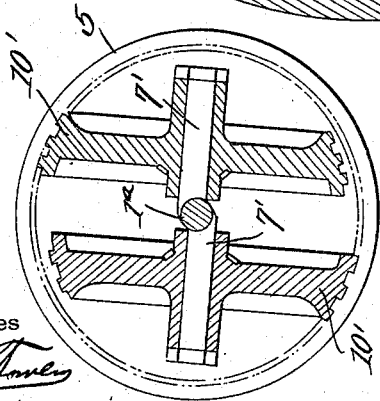
Joseph Arner, Inventor,
by C. A. Snow & Co.
Attorneys.
Witnesses

UNITED STATES PATENT OFFICE.

JOSEPH ARNER, OF WASHINGTON, DISTRICT OF COLUMBIA, ASSIGNOR OF ONE-FOURTH TO GEORGE V. GADDE AND THREE-SIXTEENTHS TO CLAUDE C. HAWBAKER, BOTH OF WASHINGTON, DISTRICT OF COLUMBIA.

TRANSMISSION MECHANISM.

1,226,048.      Specification of Letters Patent.      Patented May 15, 1917.

Application filed March 14, 1914. Serial No. 824,809.

*To all whom it may concern:*

Be it known that I, JOSEPH ARNER, a citizen of the United States, residing at Washington, in the District of Columbia, have invented a new and useful Transmission Mechanism, of which the following is a specification.

The present invention relates to improvements in transmission mechanisms, one object of the invention, being the provision of a mechanism of this character, in which there is interposed between the driving and driven elements, an internal gear and a freely rotatable gear, said freely rotatable gear being in mesh at one point with the internal gear and being bodily carried by one of the elements, the pitch of the respective gears being such that at a predetermined speed no motion will be transmitted from the driving to the driven element but by means of a device for retarding the freely rotatable gear, the rotation of such freely rotatable gear is retarded to such an extent as to provide a transmitting connection between the two gears without affecting the speed of the driving elements.

A further object of the invention is to provide a simple gear transmission mechanism to give exactly the same results as a friction gear and to avoid the shifting of gears in mesh as is the case with cog gears at present on market and to furnish an easy speed variation by a lever directly underneath the steering gear in the same position as the usual automobile control, and to decrease working parts to a minimum, the present transmission having its gears in mesh at all times, thus avoiding the racking of the gears.

In the form of transmission mechanism of this character, it is preferable that the element to which the freely rotatable gears are mounted, will carry two of such gears and that such gears will engage the internal gear at diametrically opposite points so as to equalize the strain between the parts due to the retardation of the rotary action of the freely rotatable gears and the consequent effect thereof upon the internal gear, in the preferred form the internal gear being connected to the driven shaft or element, while the freely rotatable gears are connected to and rotated by the driving element or shaft.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—

Fig. 2 is a section taken on line 2—2 of Fig. 1.

Fig. 3 is a view on a smaller scale showing a diagram in which the freely rotatable gears are positioned at a different angle to the median line of the internal gear.

Figure 1:
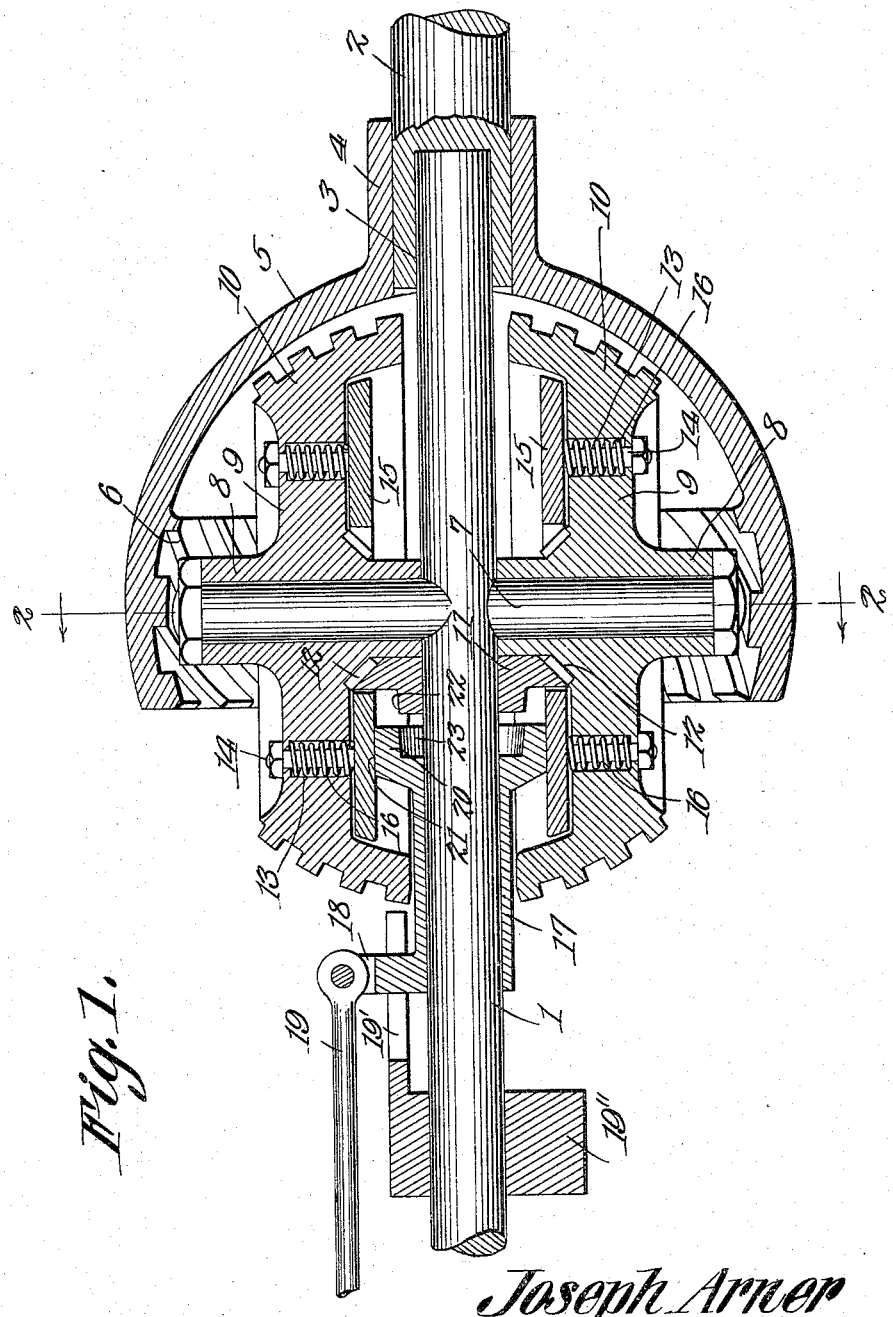
Figure 1 is a longitudinal section view through the present transmission mechanism showing parts of the driving and driven shafts.

Referring to the drawings, and more particularly to Figs. 1 and 2 thereof, the numeral 1 designates the driving shaft and 2 the driven shaft, the driven shaft being socketed as at 3 for the reception of one end of the driving shaft. Keyed to the driven shaft 2 is a sleeve 4, which carries the cup or semi-globular shaped member 5, provided with the internal gear teeth 6.

Carried by the driving shaft 1 and extending in opposite directions thereto, are the stub shafts or pins 7, upon each one of which is rotatably mounted, the sleeve 8 of the respective gears 9, said gears 9 being toothed at 10 to correspond with the pitch and curvature of the teeth 6 of the member 5. These gears, as clearly illustrated in Fig. 2, mesh at only one point with the internal gear 6 so that both gears mesh at substantially diametrically opposite points with the internal gear and thus as the shaft 1 is rotated at a given speed, the engagement of the gears 9 with the internal gear 6 will cause such gears 9 to be freely rotated upon their shaft 7 and thus no motion will be transmitted from the shaft 1 to the shaft 2.

In order to provide means whereby the rotary motion imparted to the gears 9 may be retarded and therefore a driving connection will be established between the contact of the gears 9 with the internal gear 6, to thus rotate the driven shaft 2 at the desired speed, the respective sockets 13 are provided in the gears 9 while mounted therein for sliding movement are the pins or bolts 14 which properly support the annular plates 15, one to each gear 9 in place, the springs 16 being provided to normally press the plates 15 inwardly toward the shaft 1.

A sleeve 17 is mounted for longitudinal movement upon the shaft 1 and is provided with a lug 18 which is connected to the rod 19, said rod 19 being manually operable to slide the sleeve 17 upon the shaft 1 and between the bifurcated end 19' of the fixed member 19''. Upon the inner end of the sleeve 17 is provided the member 20 whose outer periphery 21 is cylindrical and is in engagement with both of the plates 15, so that when the sleeve 17 is slid outwardly from the center of the plates 15, toward the periphery thereof, the friction action between the member 21 and the plates 15 will retard the rotation of the plates 15 and consequently the gears 9 so that the driving action between the shaft 1 and the shaft 2 will be gradually increased until a direct connection is afforded through the toothed portions 10 of the gears 9 and the gear 6. The farther the member 21, is moved toward the center of the gears 9, the greater the speed at which the gears 9 will be rotated.

In order to provide a means for imparting reverse rotation to the internal gear 6 and consequently the driven shaft 2, a bevel pinion 11 is freely rotatable upon the shaft 1 adjacent the gears 9 and is in mesh at all times with the gear portions 12 of the two gears 9. A clutch portion 22 is formed upon the gear 11 and as the member 21 is provided with the internal clutch portion 23, for engagement with the portion 22 when the sleeve 17 is pushed inwardly toward the center of the gears 9 and to its further extent, the gear 11 will be held fast by the sleeve 17 and consequently as the shaft 1 is rotating and the gears 9 are carried about the stationary gear 11, the toothed portion thereof and the beveled gear portions 12 of the gears 9 will cause the gears 9 to be rotated at a greater speed and consequently through the engaging portion of the teeth 10 with the internal gear 6 rotate the member 5 in an opposite direction and consequently impart a reverse rotation to the shaft 2.

It will be noted that the stub shafts 7, as clearly illustrated in Fig. 2, are disposed in parallel, but are not axially alined with each other, this being accomplished to permit the proper meshing of the gears as there illustrated as it is necessary that such gears only engage the internal gear at one point.

In Fig. 3, a slightly different positioning of the shafts 7' as regards the driving shaft 1ª is illustrated, the gears 10' in this instance being positioned so that they do not engage the internal gear 6' of the member 5' at a point at right angles to the axes of the shafts 7', or as shown in Fig. 2. This merely illustrates one of many methods of mounting the gears so that the internal gear is only in engagement at one point.

From the foregoing description taken in connection with the drawings, it is evident that a transmission mechanism of this character permits of a greater latitude of speed than any other gear transmission without the placing in and out of mesh of the gears, thus preventing any racking of the gear portions, it merely being done by a retarding and speeding action of the freely rotatable gears relatively to the internal gear.

The pitch of the teeth of the internal gear 6, and the teeth 10 are to be so constructed that regardless of the plates 15 and the brake or piston member 21, a certain amount of transmission will be imparted from the driving to the driven element, this being particularly so when the speed of the driving element is accelerated. Thus these teeth are the main power transmitters.

Having thus described the invention, what is claimed as new is:

1. A transmission mechanism, including a driving element, a driven element, an internal gear carried by one of the elements, a rotatable gear carried by the other element and having its teeth in mesh at one point with the internal gear, and selective means for regulating the speed of the rotary gear and the speed and forward or reverse transmission effect between the driving and driven elements.

2. A transmission mechanism, including a driving and driven element, an internal gear carried by one of the elements, a gear mounted for independent and free rotation in mesh at one point with the internal gear and carried bodily by the other element, the rotation of the driving element imparting rotary movement to the free gear, and means for regulating the speed of the free gear independent of the speed of the driving element and consequently the speed and forward or reverse movement transmitted to the driven element.

3. A transmission mechanism, including a driving element, a driven element, an internal gear carried by one of the elements, a rotatable gear carried by the other element and having its teeth in mesh at one point with the internal gear, selective means for regulating the speed of the rotary gear and the transmission effect between the driving and driven elements, and coöperable means interposed between the selective means and the freely rotatable gear whereby a greater speed is imparted to the rotatable gear and a consequent reversal of rotation to the driven element.

4. A transmission mechanism, including driving and driven elements, an internal gear carried by one of the elements, a gear mounted for independent and free rotation in mesh at one point with the internal gear and carried bodily by the other element, the rotation of the driving element imparting rotary movement to the free gear, means for regulating the speed of the free gear independent of the speed of the driving element and consequently the speed transmitted to the driven element, and coöperable means interposed between the last means and the freely rotatable gear whereby a greater speed is imparted to the rotatable gear and a consequent reversal of rotation to the driven element.

5. A transmission mechanism, including a driving shaft, a driven shaft, an internal gear carried by the driven shaft, a rotatable gear carried by the driving shaft and having its teeth in mesh at one point with the internal gear, and a relatively fixed slidingly mounted selective means disposed to engage the rotatable gear to regulate the free rotation thereof without effecting the rotation of the driving shaft, whereby the speed transmitted from the driving to the driven shaft is regulated.

6. A transmission mechanism, including a driving shaft, a driven shaft, an internal gear carried by the driven shaft, a rotatable gear carried by the driving shaft, and having its teeth in mesh at one point with the internal gear, a relatively fixed slidingly mounted selective means disposed to engage the rotatable gear to regulate the free rotation thereof without effecting the rotation of the driving shaft, whereby the speed transmitted from the driving to the driven shaft is regulated, and coöperable means interposed between the sliding element and the rotatable gear for causing the rotatable gear to be rotated at a greater speed to thereby transmit motion to the driven shaft in a reverse direction.

7. A transmission mechanism, including a driving shaft, a driven shaft, an arm carried by the driving shaft, one gear mounted for rotation upon said arm, an internal gear fixed to the driven shaft and having a portion thereof in mesh at one point with the rotatable gear, and a selective means for retarding the rotation of the freely rotatable gear to regulate the speed transmitted from the driving to the driven shaft.

8. A transmission mechanism, including a driving shaft, a driven shaft, an arm carried by the driving shaft, a freely rotatable gear mounted upon said arm, an internal gear fixed to the driven shaft and having a portion thereof in mesh at one point with the rotatable gear, a selective means for retarding the rotation of the freely rotatable gear to regulate the speed transmitted from the driving to the driven shaft, and means operable by the selective means for increasing the speed of the freely rotatable gear and imparting a reverse rotation to the driven shaft.

9. A transmission mechanism, including a driving shaft, a driven shaft, two arms carried by the driving shaft, two gears one mounted for rotation upon each arm, an internal gear fixed to the driven shaft and having a portion thereof in mesh at one point of each of the respective freely rotatable gears, and a selective means for retarding the rotation of the freely rotatable gears to regulate the speed transmitted from the driving to the driven shaft.

10. A transmission mechanism, including a driving shaft, a driven shaft, two arms carried by the driving shaft, two gears one mounted for rotation upon each arm, an internal gear fixed to the driven shaft and having a portion thereof in mesh at one point of each of the respective freely rotatable gears, a selective means for retarding the rotation of the freely rotatable gears to regulate the speed transmitted from the driving to the driven shaft, and means operable by the selective means for causing a reverse rotation to be imparted to the driven shaft.

11. A transmission mechanism, including a driving shaft, a driven shaft, two arms carried by the driving shaft, two gears one mounted for rotation upon each arm, an internal gear fixed to the driven shaft and having a portion thereof in mesh at one point of each of the respective freely rotatable gears, a resiliently supported annular plate carried upon the inner face of each freely rotatable gear, a sleeve slidably mounted upon the driving shaft and held against rotation therewith, and a friction means carried by said sleeve and in engagement with both annular plates to coöperate therewith to retard the speed of the freely rotatable gears.

12. A transmission mechanism, including a driving shaft, a driven shaft, two arms carried by the driving shaft, two gears one mounted for rotation upon each arm, an internal gear fixed to the driven shaft and having a portion thereof in mesh at one point of each of the respective freely rotatable gears, a resiliently supported annular plate carried upon the inner face of each freely rotatable gear, a sleeve slidably mounted upon the driving shaft and held against rotation therewith, a friction means carried by said sleeve and in engagement with both annular plates to coöperate therewith to retard the speed of the freely rotatable gears, said freely rotatable gears being provided each with an internal gear, a gear freely rotatable upon the driving shaft engaging both of said internal gears, and coöperative clutch members carried by the latter gear and the sleeve for holding the latter gear in a fixed relation to the driving shaft, whereby a greater rotation is imparted to the freely rotatable gears and consequently the driven shaft.

13. A transmission mechanism, including a driving element, a driven element, an internal gear carried by one of the elements, a rotatable gear carried by the other element and having its teeth in mesh at one point with the internal gear, and selective means for varying the speed of rotation of the rotatable gear and consequently the speed and direction of rotation of the driven element.

14. A transmission mechanism including a driving element, a driven element, a spiral gear carried by one of the elements, a rotatable spiral gear carried by the other element, and in mesh at one point with the first named spiral gear, and selective means for regulating the speed of the rotatable gear and the speed and forward or reverse transmission effect between the driving and driven elements.

In testimony that I claim the foregoing as my own, I have hereto affixed my signature in the presence of two witnesses.

JOSEPH ARNER.

Witnesses:
SELINA WILLSON,
I. E. SIMPSON.

Copies of this patent may be obtained for five cents each, by addressing the "Commissioner of Patents, Washington, D. C."